US012000548B2

(12) United States Patent
Marquardt et al.

(10) Patent No.: US 12,000,548 B2
(45) Date of Patent: Jun. 4, 2024

(54) REMOTE PHOSPHOR MASKS FOR RETROFITTING LUMINAIRES

(71) Applicant: ABL IP Holding LLC, Atlanta, GA (US)

(72) Inventors: Craig Eugene Marquardt, Covington, GA (US); Qi Ai, Peachtree City, GA (US); Barry Goldman, Decatur, GA (US)

(73) Assignee: ABL IP Holding LLC, Atlanta, GA (US)

( * ) Notice: Subject to any disclaimer, the term of this patent is extended or adjusted under 35 U.S.C. 154(b) by 139 days.

(21) Appl. No.: 17/681,072

(22) Filed: Feb. 25, 2022

(65) Prior Publication Data

US 2022/0268406 A1 Aug. 25, 2022

Related U.S. Application Data

(60) Provisional application No. 63/153,539, filed on Feb. 25, 2021.

(51) Int. Cl.
*F21K 9/64* (2016.01)

(52) U.S. Cl.
CPC .................................... *F21K 9/64* (2016.08)

(58) Field of Classification Search
CPC .... F21K 9/64; F21Y 2105/16; F21Y 2115/10; F21V 5/007; F21V 3/08
See application file for complete search history.

(56) References Cited

U.S. PATENT DOCUMENTS 7,213,940 B1 * 5/2007 Van De Ven .......... H05B 45/20 257/89
2012/0235560 A1 * 9/2012 Pickard ..................... F21S 8/02 313/504

* cited by examiner

*Primary Examiner* — Anne M Hines
*Assistant Examiner* — Jose M Diaz
(74) *Attorney, Agent, or Firm* — Kilpatrick Townsend & Stockton LLP

(57) ABSTRACT

A light system may include a luminaire comprising one or more light emitters and at least one optic. The light system may include a remote phosphor mask that is reversibly coupled with the luminaire using at least one reversible coupling mechanism. The remote phosphor mask may include one or more phosphors admixed with an optical material. The one or more phosphors may be capable of adjusting a color temperature of emitted light from the luminaire.

17 Claims, 8 Drawing Sheets

REMOTE PHOSPHOR MASKS FOR RETROFITTING LUMINAIRES

CROSS-REFERENCES TO RELATED APPLICATIONS

This application claims the benefit of U.S. Provisional Application No. 63/153,539, entitled "REMOTE PHOSPHOR MASKS FOR RETROFITTING LUMINAIRES" filed on Feb. 25, 2021, which is hereby expressly incorporated by reference in its entirety for all purposes.

BACKGROUND

Light fixtures for LED lights may include phosphors to absorb some light energy at certain wavelengths and re-emit at least a portion of the light energy at longer wavelengths. For example, the phosphors can be applied as a coating or mixed into an optical material that forms part of a single LED chip package, such as a lens or other cover of the LED package. This enables the net light emission from the packaged chip to approximate "white" light in that there is a mixture of wavelengths. However, occasionally these phosphors break off or are otherwise no longer present on the chip package. In such instances, light emitted where the phosphors are no longer present, which may cause such light to emit from the light source at different wavelengths than the rest of the light, which may cause a noticeable defect in the light source. In light sources that include a large number of LEDs (or other light emitting devices), a small number of defects may require the entire light source to be replaced, which may lead to considerable waste and expense. Therefore, improvements in phosphor lighting techniques are desired.

BRIEF SUMMARY OF THE INVENTION

Embodiments of the present invention may encompass light systems. The light systems may include a luminaire comprising one or more light emitters and at least one optic. The light systems may include a remote phosphor mask that is reversibly coupled with the luminaire using at least one reversible coupling mechanism. The remote phosphor mask may include one or more phosphors admixed with an optical material. The one or more phosphors may be capable of adjusting a color temperature of emitted light from the luminaire.

In some embodiments, the remote phosphor mask may be disposed outward of the at least one optic. The remote phosphor mask may be disposed between the one or more light emitters and the at least one optic. A light emission portion of the remote phosphor mask may include at least one contour that conforms to a three dimensional shape of one or both of the one or more light emitters and the at least one optic. The at least one contour may include a projection that defines at least one cavity. The at least one cavity may receive at least a portion of one or both of the one or more light emitters and the at least one optic. The at least one reversible coupling mechanism may include an adhesive. The at least one reversible coupling mechanism may be selected from the group consisting of a fastener, a clamp, an interference fit connection, a press fit connection, a clip, and a snap. The light systems may include a base that supports the one or more light emitters and the at least one optic. The light systems may include an outer frame that extends over a portion of the remote phosphor mask and couples with the base to secure the remote phosphor mask to the luminaire.

Some embodiments of the present technology may encompass remote phosphor masks for a luminaire. The masks may include a body formed of an optical material admixed with one or more phosphors. The body may include a light emission portion. The one or more phosphors may be capable of adjusting a color temperature of emitted light from the luminaire. The body may be configured to be reversibly coupled with the luminaire using at least one reversible coupling mechanism.

In some embodiments, the remote phosphor mask may be configured to be positioned remote from a light emitter of the luminaire. The light emission portion of the remote phosphor mask may include at least one contour that conforms to a three-dimensional shape of one or both of a light emitter and an optic of the luminaire. The at least one reversible coupling mechanism may include an adhesive applied to an inner surface of the remote phosphor mask. The at least one reversible coupling mechanism may be selected from the group consisting of a fastener, an aperture for receiving a separate fastener, a clamp, an interference fit connector, a press fit connector, a clip, and a snap. The light emission portion of the remote phosphor mask may have a substantially uniform thickness.

Some embodiments of the present technology may include methods of using a remote phosphor mask. The methods may include providing a remote phosphor mask on a luminaire. The remote phosphor mask may include one or more phosphors. The remote phosphor mask may be reversibly coupled with the luminaire using at least one reversible coupling mechanism. The methods may include emitting light from light emitters of the luminaire. At least a portion of the light may include a shorter-wavelength light. The methods may include absorbing, by the one or more phosphors in the remote lighting mask, at least a subset of the shorter-wavelength light. The methods may include down-converting the subset of the shorter-wavelength light to longer-wavelength light. The methods may include emitting, by the one or more phosphors in the remote lighting mask, longer-wavelength light.

In some embodiments, the longer-wavelength light may have a correlated color temperature (CCT) of between about 2700K to 4000K. The shorter-wavelength light may have a correlated color temperature (CCT) of at least 5000K. The methods may include generating a predetermined light distribution by passing light emitted from the light emitters through at least one optic. The light emitted from the light emitters may be passed through the at least one optic prior to being absorbed by the one or more phosphors. The light emitted from the light emitters may be passed through the at least one optic after being absorbed emitted by the one or more phosphors.

BRIEF DESCRIPTION OF THE DRAWINGS

A further understanding of the nature and advantages of the disclosed technology may be realized by reference to the remaining portions of the specification and the drawings.

Figure 1A:
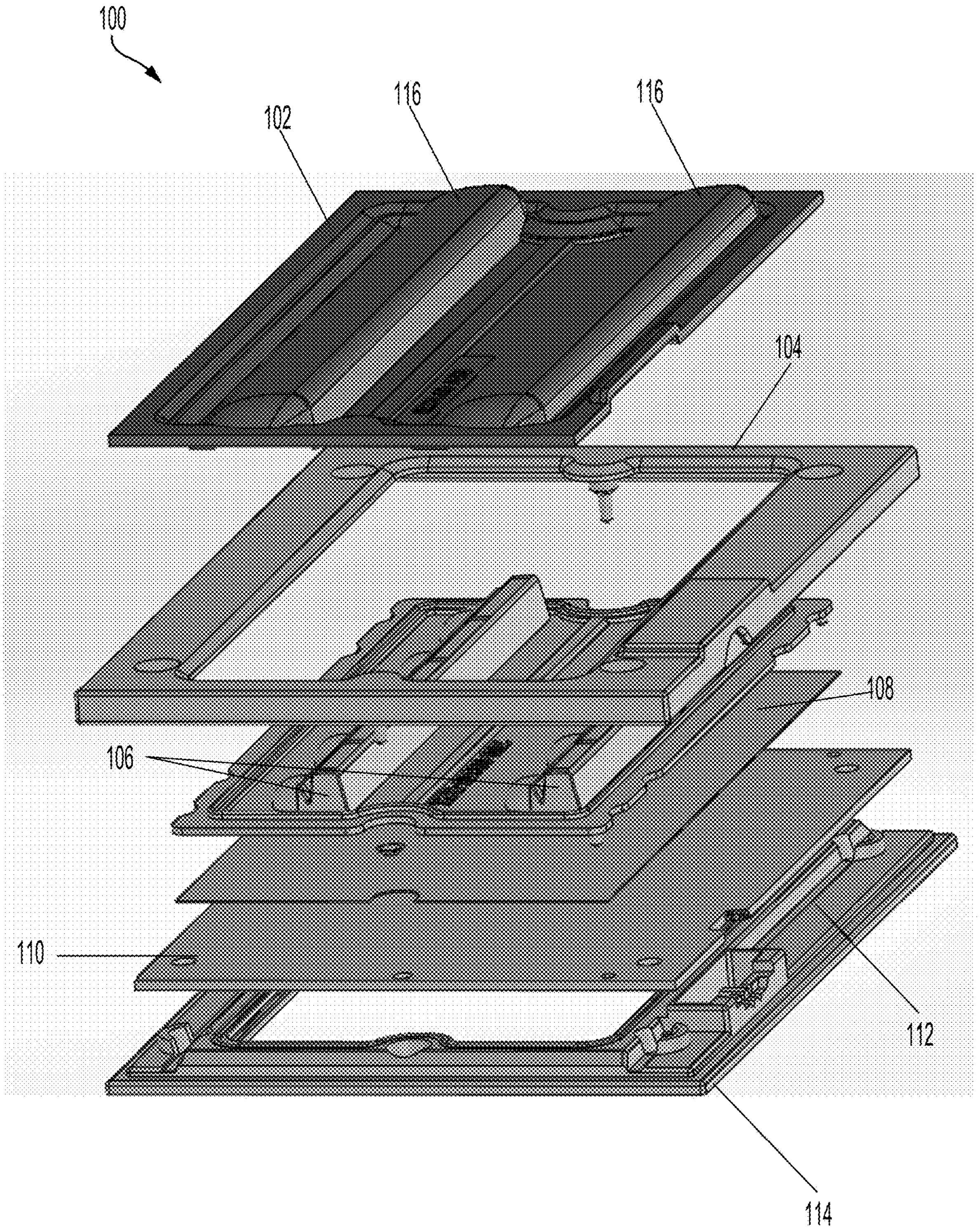
FIG. 1A is an exploded isometric view of exemplary portions of a luminaire that includes a remote phosphor mask according to one or more examples of the present disclosure.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "forward," and "aft," among others, are intended to refer to the orientation as illustrated and described in the figure (or figures) to which the components and directions are referencing but are not intended to imply any particular configuration.

Some present day luminaires are populated with LEDs as light emitters. The LEDs are typically semiconductor chips that emit light within a fairly narrow wavelength range and energy per photon dictated by properties of the semiconductor material used. LEDs are typically very reliable, with service lifetimes that may extend ten years, twenty years or more. Because of this reliability, and unlike their incandescent light bulb predecessors, LEDs may not be treated as user replaceable parts; luminaires that use LEDs as light sources are typically designed with the LEDs built in, and not especially easy to replace. This can create problems if anything does go wrong in service at the LED level.

LED chips are often packaged with one or more phosphors that downconvert wavelength of at least some of the light emitted by the chip. That is, the phosphors absorb light at the characteristic wavelength emitted, and re-emit at least some of that light at one or more longer wavelengths. Conventionally, the phosphors are applied as a coating or mixed into an optical material that forms part of a single LED chip package, such as a lens or other cover of the LED package. This enables the net light emission from the packaged chip to approximate "white" light in that there is a mixture of wavelengths. The specific "white" of an LED can be categorized by its correlated color temperature (CCT). LEDs with only a small amount of phosphor, or which use a phosphor that does not create much light in the red and yellow wavelength ranges, typically have high CCT, e.g., 5000K to 6000K, or higher. This CCT is similar to that of sunlight at high noon, and can be somewhat difficult to look at, even when reflected by other objects. Usually, humans tend to prefer scenes illuminated by a "warmer" light in the 2700K to 4000K CCT range.

If one or more phosphors break off or are otherwise no longer present on the LED chip package, the affected portion of the luminaire may emit light with an undesired color temperature. This may lead to the entire luminaire needing to be replaced. This may present a particularly large problem in luminaires that include a large number of LEDs, as a small number of phosphor defects may lead to replacement of the luminaire, which may be cost prohibitive and wasteful.

To address these and other issues, embodiments of the present invention are directed to systems and methods for implementing a remote phosphor layer for a luminaire are disclosed. In some embodiments, the phosphor layer is implemented as a mask that can be attached over or between features of an existing luminaire. This is particularly useful for cases in which an installed luminaire ceases to function properly and emits light of an unintended color temperature. Adding the mask as a simple field retrofit can be done at much lower cost than replacing the entire luminaire. In other use cases for the same or other embodiments, a mask that includes a remote phosphor can be added to or removed from a luminaire by an end user, to adjust the color temperature of the luminaire as a matter of preference. In yet other use cases, the remote phosphor mask may be installed as a replaceable component of a luminaire by the manufacturer. This may enable the remote phosphor mask to be removed and/or replaced if damaged (or to change the color temperature of the luminaire) without the need to replace the rest of the luminaire.

The remote phosphor mask may absorb a subset of light energy emitted from light emitters of the luminaire and re-emit at least some of the light energy as longer wavelength light. For example, the subset of light that is absorbed by the remote phosphor mask may include light with wavelengths corresponding to blue light and re-emit wavelengths corresponding to green, yellow and/or red light. The light that is not absorbed may mix with the re-emitted light to form approximately white light. The remote phosphor mask may be a mask, a film, a plate, a combination thereof, or other suitable configuration for coupling phosphor on the luminaire remote from the LED chip package or other light emitters of the luminaire. The remote phosphor mask may be affixed to the luminaire mechanically, using adhesive and/or using other suitable methods. The remote phosphor mask may be affixed during manufacture of the luminaire and/or may be retrofitted to the luminaire after the luminaire is manufactured. The remote phosphor mask may be contoured such that the remote phosphor mask may fit over existing surfaces such as mechanical features and/or optics of the luminaire.

FIG. 1 illustrates an exploded view of exemplary portions of a luminaire 100 that includes a remote phosphor mask 102 according to one or more examples of the present disclosure. In the example shown, luminaire 100 may include components such as the remote phosphor mask 102, a frame or housing 104, one or more lenses 106 and/or other optics, a circuit board 108 that includes one or more light emitters (e.g., LEDs), a thermal transfer pad 110, and a silicone gasket 112, which are arranged atop a base 114. In other examples, luminaires like luminaire 100 may include a subset of the components shown and/or may include additional suitable components for emitting light, for providing mechanical support, for providing electrical power to the light emitters, and the like. The luminaire 100 may be configured to provide a specific light distribution, and the remote phosphor mask 102 may be configured such that the specific light distribution is substantially maintained. For example, each lens 106 and/or other optic may be selected to distribute light emitted from the LEDs in a desired manner. The remote phosphor mask 102 may be part of the original design of luminaire 100, or may be retrofitted to the luminaire 100, that is, the phosphor mask 102 may be affixed to the luminaire 100 subsequent to the luminaire 100 being manufactured. The remote phosphor mask 102 may be positioned remotely from the light emitters. As used herein, “remote” may be understood to mean a component that is separate and outward of the light emitters (e.g., LEDs). For example, the remote phosphor mask 102 may be a separate, replaceable component from the light emitter assembly, and may be positioned adjacent the light emitters or spaced apart via one or more intervening components, such as lenses 106.

The remote phosphor mask 102 be made from an optical material (e.g., glass, silicone resins, polymers (such as polymethylmethacrylate (PMMA), polycarbonate, cyclic olefin polymers, polymethacrylmethylimid (PMMI)), and the like) and one or more phosphors. Preferably, the remote phosphor mask is formed by mixing an optical material with one or more phosphors to form a mixture, after which the mixture is molded and cured (or otherwise hardened). In embodiments, the remote phosphor mask 102 may be a mixture of an optical material and between 0.5% and 10% by weight of the optical material, and preferably between 1% and 5% by weight of the optical material, of one or more phosphors that can be excited by light energy of one wavelength range (e.g., 400 nm to 480 nm), and re-emit at least a portion of the light energy at one or more longer wavelengths, such as between 480 nm and 830 nm, or more commonly between 480 nm and 780 nm. Some suitable phosphors that may be used in the remote phosphor mask 102 may include aluminum cerium yttrium oxide, cerium doped yttrium aluminum garnet (in some embodiments the cerium may be replaced by other rare-earth elements such as terbium and gadolinium), and/or a (Ca,SR)AlSiN3-based phosphor, although other phosphors may be used in various embodiments.

The phosphor(s) may cause remote phosphor mask 102 to alter a color temperature of the light emitted by the luminaire 100. For example, the remote phosphor mask 102 may shift emitted light that would be perceived as “cool,” e.g., with color temperature of approximately 5000K to 6000K to a “warm” light of approximately 2700K to 3500K without significantly altering the brightness or the directionality of the emitted light. However, there may be slight impacts to both brightness and directionality. For example, the light absorbed by the phosphor(s) may be traveling in a particular direction when absorbed, but the light re-emitted will be re-emitted in random directions. Thus, the light distribution from luminaire 100 with phosphor mask 102 may be more diffuse when the phosphor mask 102 is present than the light distribution from luminaire 100 without phosphor mask 102.

The remote phosphor mask 102 may have any suitable geometry. For example, the remote phosphor mask 102 may be formed from a generally planar or flat sheet that is designed to extend over the LEDs or other light emitters in some embodiments. In other embodiments, the remote phosphor mask 102 may be domed or otherwise curved to extend over each of the LEDs. In some embodiments, the remote phosphor mask may be designed to reduce or even minimize interference with the light distribution produced by the lens 106 and/or other optic to ensure that a large percentage of the light emitted by the luminaire follows the light distribution generated by the lens 106. For example, the remote phosphor mask 102 may include one or more nonplanar features, such as protrusions and/or indentations, which may be position to conform to, accommodate, and/or otherwise be compatible with various three-dimensional features of the luminaire, including the light emitters, lens, and/or other optic. This may enable the remote phosphor mask 102 have a shape that conforms (e.g., has a contour that at least generally matches a given shape) to a surface of the luminaire 100. For example, in the illustrated embodiment luminaire 100 may include a number of lenses 106 that project outward relative to base 114. As best shown in the cross sectional view of FIG. 1A, the remote phosphor mask 102 may include projections 116 (such as at light emission portions of the remote phosphor mask 102) that are aligned with a respective one of the lenses 106. Each projection 116 defines a cavity 118 on a rear side of the remote phosphor mask 102. The cavities 118 may be sized and shaped to receive a respective one of the lenses 106 and/or light emitters such that all light emitted from the LEDs and through the respective lens 106 passes through the respective projection 116. In some embodiments, the surfaces of the cavities may conform to and/or be generally parallel to outer surfaces of the lens 106 (or other optic) and/or LED, which may help distribute light emitted from the LEDs and/or optics through approximately the same thickness of phosphor mask 102 irrespective of an emission angle of the light. The thickness of the remote phosphor mask 102 may be substantially constant across the remote phosphor mask 102, and in particular across the light emission surface(s) of the remote phosphor mask 102. This may help allow light emitted from luminaire 100 to pass through approximately the same thickness of phosphor mask 102 irrespective of an emission angle of the light, which may help prevent the remote phosphor mask 102 from substantially affecting a directionality of light produced by the luminaire 100. These features may improve the distribution of light emitted by the luminaire such that the emitted light appears substantially uniform, without noticeable bright or dull spots.

Figure 1B:
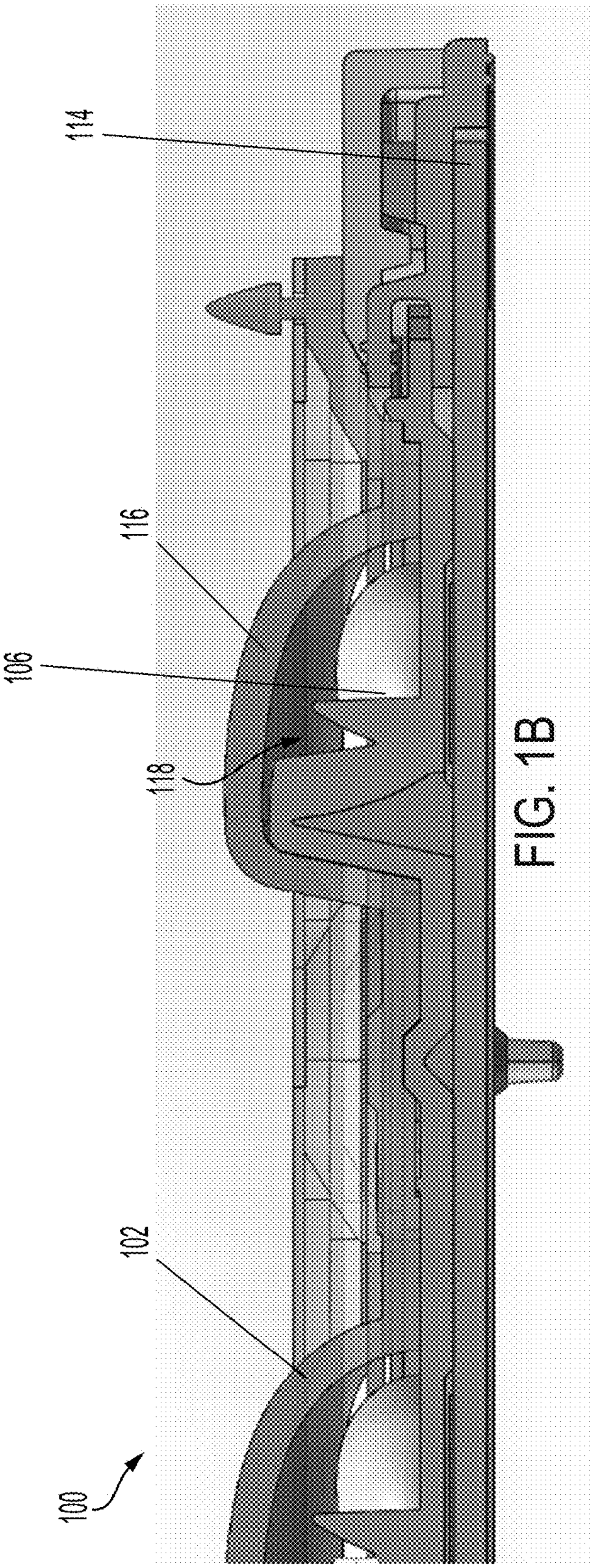
FIG. 1B is a cross sectional side elevation view of the luminaire of FIG. 1A.

The remote phosphor mask 102 may be affixed to luminaire 100 using a variety of techniques. As illustrated in FIGS. 1A and 1B, the remote phosphor mask 102 can be affixed to the luminaire 100 mechanically using an outer frame 124, which may be coupled with the base 114. For example, the outer frame 124 may extend over a portion of the remote phosphor mask 102 (such as peripheral edges, areas between the lenses 106, and/or other locations) and be fastened or otherwise affixed to the base 114 to clamp the various components of the luminaire 100 together. Preferably, the outer frame 124 is configured such that the outer frame 124 does not affect functionality of the remote phosphor mask 102 and retains the remote phosphor mask 102 in a position relative to the luminaire 100 that allows the remote phosphor mask 102 to function as desired. For example, the outer frame 124 may define openings that are aligned with the lenses 106 and, if present, projections 116. These openings may allow light passing through the remote phosphor mask 102 to exit the luminaire 100 without being obstructed and/or otherwise interfered with by the outer frame 124. In some embodiments, rather than being secured to the luminaire 100 using a separate component (e.g., the outer frame 124), the remote phosphor mask 102 may be secured against an outer surface of the luminaire 100. For example, the remote phosphor mask 102 may be fastened and/or adhered directly to an outer surface of the luminaire 100. In some embodiments, the remote phosphor mask 102 and/or luminaire 100 may include one or more clamps, clips, snaps, and/or other connectors that may enable the remote phosphor mask 102 to be quickly secured over an outer surface of the luminaire. In some embodiments, the remote phosphor mask 102 may be secured to one or more internal and/or external components of the luminaire 100 using a press or interference fit connection. Embodiments in which the remote phosphor mask 102 is an outermost component of the luminaire 100 may make replacement and/or retro-fitting quicker and easier, as no other components (with the exception of fasteners, etc.) of the luminaire 100 need to be removed to access the remote phosphor mask 102. Alternatively, the remote phosphor mask 102 may be affixed within or outside of luminaire 100 using an adhesive. For example, all or part of an inner surface of the remote phosphor mask 102 may include a pre-applied adhesive that may be used to secure the remote phosphor mask 102 to one or more surfaces of the luminaire. In some embodiments, a release liner may be positioned over the adhesive until the remote phosphor mask 102 is ready to be installed. Such release liners may be particularly useful when the remote phosphor mask is designed as a retrofit and/or replacement component. For example, an adhesive that is pre-applied to a remote phosphor mask 102 can be exposed by removing a tape and/or other release liner from the adhesive, and pressing the remote phosphor mask 102 in place, making installation quick and easy. In some embodiments, the remote phosphor mask 102 may be reversibly coupled with the luminaire 100 using at least one reversible coupling mechanism such that the remote phosphor mask 102 may be removed and/or replaced without the need to replace other components of the luminaire 100. As used herein, "reversibly coupled" may be understood to mean that the remote phosphor mask 102 may be secured to and removed from one or more components of the luminaire 100 without causing damage to the remote phosphor mask 102 or luminaire 100. Reversibly coupling the components may require no tools, or basic tools (such as tools for engaging/disengaging fasteners, etc.), and may include use of adhesives in some embodiments. Reversible coupling mechanisms may include, without limitation, adhesives, fasteners, apertures for receiving a separate fasteners, clamps, interference fit connectors, press fit connectors, clips, and/or snaps.

Figure 1C:
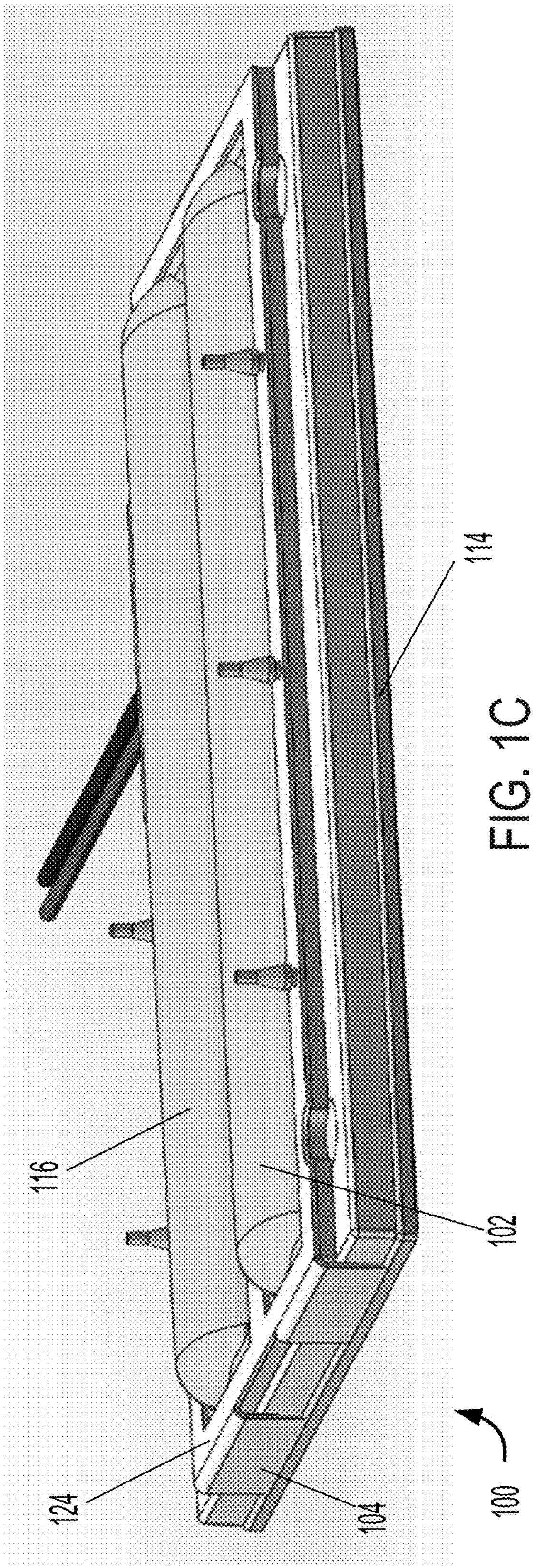
FIG. 1C is an assembled isometric view of the luminaire of FIG. 1A.

In some embodiments, the remote phosphor mask 102 may form an outermost light emitting surface of luminaire 100, such as illustrated in FIGS. 1A-1C. In other embodiments, the remote phosphor mask 102 may be positioned closer to the light emitting elements (e.g., LEDs). For example, the remote phosphor mask 102 may be at any position that is outward of the light emitting elements in a direction of the emitted light. As one particular example, the remote phosphor mask 102 may be disposed between the light emitting elements and the lens 106 and/or other optic, such that the color temperature of the light is altered prior to reaching the optic.

The remote phosphor masks 102 described herein may be custom built to fit around contours of the existing luminaire lenses and/or other component. This enables the thickness of the remote phosphor mask 102 (or at least the light emission portions that are at least generally aligned with the light emitters and/or optic) to be substantially constant, even when used with various shapes of protruding optics. For example, the substantially uniform thickness of the remote phosphor mask 102 may allow the light passing through the remote phosphor mask 102 to be uniform in every direction in which the light leaves the optic(s). That is, low angle light will pass through about the same thickness of the remote phosphor mask 102 as high angle light, which may not occur when using a flat plate of phosphor-containing material.

As noted above, when light emitted from the LEDs and/or other light emitters passes through the remote phosphor mask 102, the light interacts with the phosphors present within the remote phosphor mask. These phosphors absorb light at a characteristic wavelength and re-emit at least some of that light at one or more longer wavelengths, thus reducing the amount of shorter-wavelength light passing through the mask and causing longer-wavelength light to be re-emitted, which may effectively change the CCT of the light emitted by the luminaire 100 to a more visually appearing level.

Figure 2:
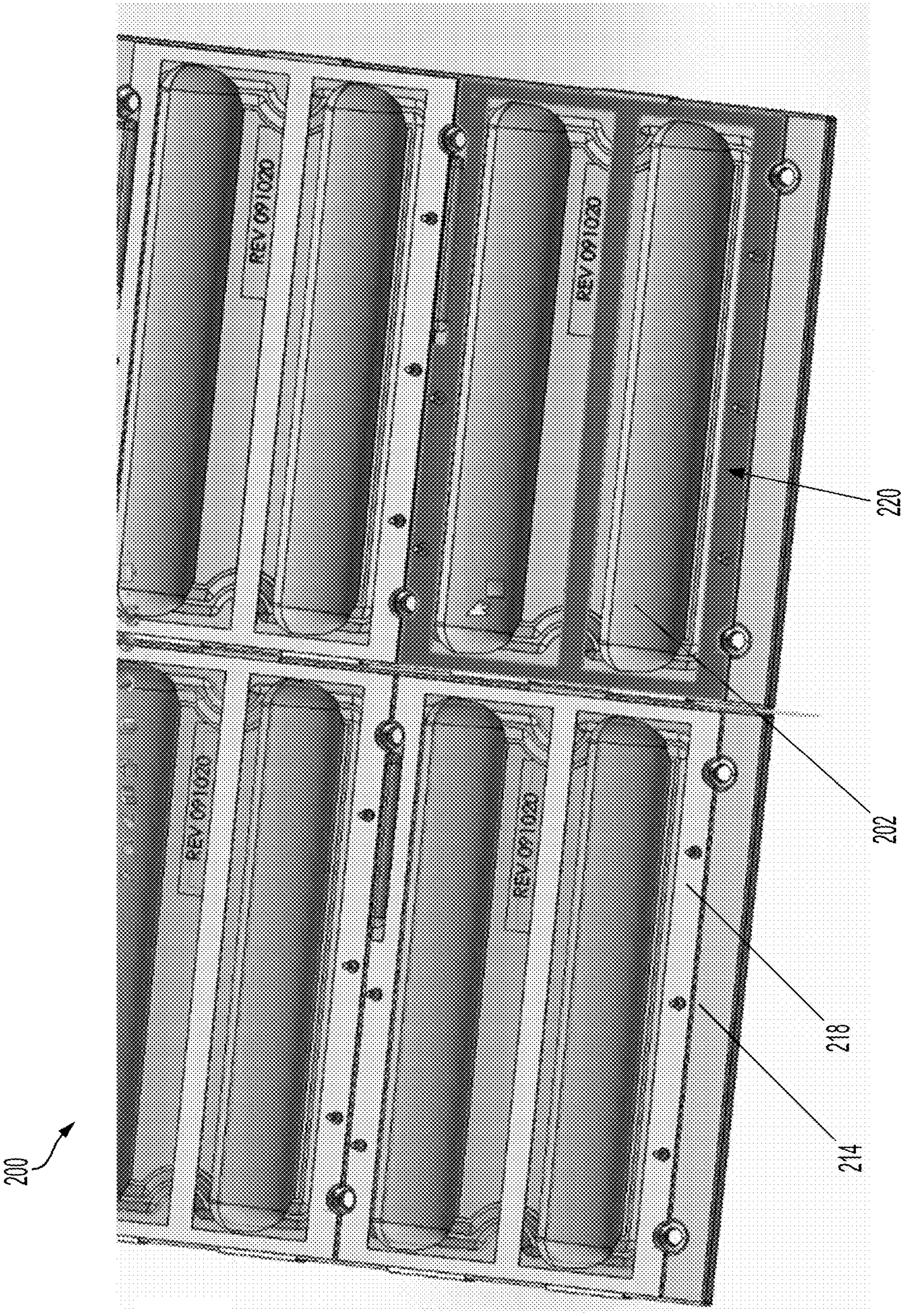
FIG. 2 illustrates a luminaire that includes a number affixed remote phosphor masks, according to one or more examples of the present disclosure.

FIG. 2 illustrates a luminaire 200 that includes a number of light modules 220 that each include a respective remote phosphor mask 202, according to one or more examples of the present disclosure. As illustrated, each light module 220 may be similar to luminaire 100, and may include a base and/or frame, one or more light emitting elements, and one or more optics. A remote phosphor mask 202 (which may include any of the features described in relation to remote phosphor mask 102 above) may be affixed to each light module 220. For example, as illustrated each remote phosphor mask 202 is fastened to a base 214 using an outer frame 218 of the respective light module 220, however it will be appreciated that the remote phosphor mask 202 may be affixed to the respective light module 220 using other techniques as described herein. For example, the remote phosphor mask 202 may be affixed to the light module 220, and subsequently, luminaire 200 using an adhesive that may be applied to a surface of the light module 220 and/or luminaire 200. In some embodiments, the remote phosphor mask 202 may be affixed to the luminaire 200 using a mechanical connection or other suitable fastening method as described elsewhere herein.

As noted above, the luminaire 200 may include several light modules 220 that are each similar to luminaire 100, which each light module 220 being provided with a dedicated remote phosphor mask 202. This may be particularly advantageous when retrofitting a light module 220 (and/or luminaire 200) with remote phosphor masks 202 and/or when replacing a damaged and/or otherwise defective remote phosphor mask 202. For example, only those remote phosphor masks 202 that are damaged and/or otherwise defective may need to be removed and/or replaced, while the remaining light modules 220 and/or remote phosphor masks 202 may remain untouched. This may help speed up the maintenance process, while also eliminating and/or reducing waste and excessive costs associated with replacement or repair of an entire luminaire.

Figure 3:
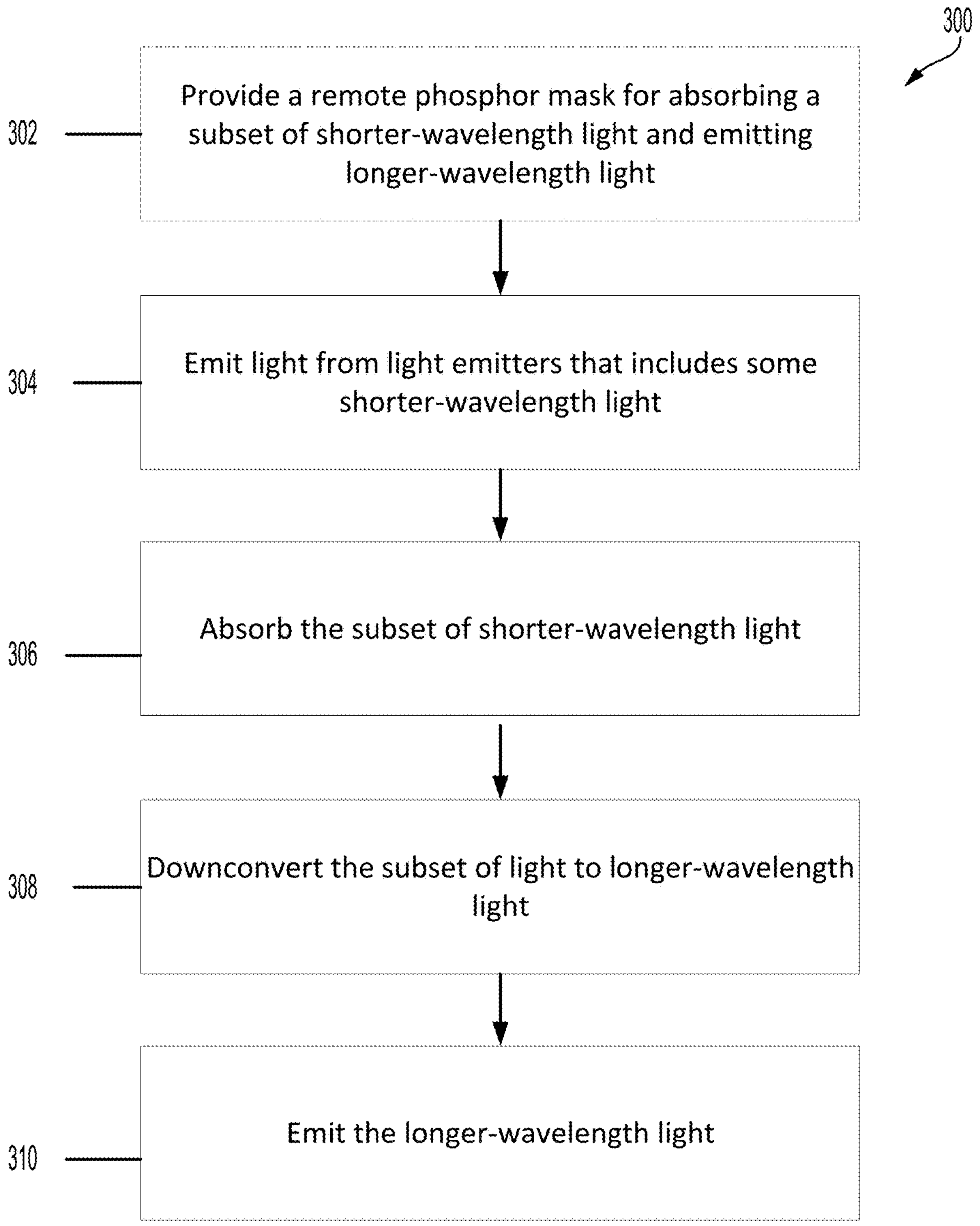
FIG. 3 is a flowchart of a process for emitting light from a luminaire that includes a remote phosphor mask according to one or more examples of the present disclosure.

FIG. 3 is a flowchart of a process 300 for emitting light from a luminaire that includes a remote phosphor mask (such as remote phosphor mask 102 or 202), so that the light includes wavelengths of light that are different from wavelengths of light originally emitted by light emitters in the luminaire, according to one or more examples of the present disclosure. At optional operation 302, the process 300 may include providing a remote phosphor mask on, or in connection with, a luminaire. For example, a remote phosphor mask may be fastened, adhered, snapped, and/or otherwise coupled with one or more internal and/or external components of a luminaire. When installed, the remote phosphor mask may be positioned relative to the luminaire such that the remote phosphor mask can receive emitted light from the light emitting elements of the luminaire. For example, the remote phosphor mask may be positioned between the light emitters and an optic of the luminaire and/or may be positioned to cover the optic.

At operation 304, the process 300 may include emitting light from light emitters of the luminaire. For example, a light engine including one or more light emitters (e.g., LEDs) within luminaire 100 may emit light within a first wavelength or range of wavelengths. In some embodiments, the emitted light may include at least some shorter-wavelength light. For example, one or more LEDs of the luminaire may develop defects (such as cracks or voids in phosphor coatings of the LEDs) that cause the affected LEDs to emit more shorter-wavelength light than designed (or equivalently, they fail to convert as much of the shorter-wavelength light to longer wavelengths, due to failure of a local phosphor). In some instances, the shorter-wavelength light may include blue light (e.g., between about 450 nm and 495 nm) and/or may have a CCT of at least 5000K, although in some embodiments, other (e.g., longer) wavelengths of light may be included in the shorter-wavelength light. The emitted light may be emitted in such a direction to be absorbable by the remote phosphor mask.

At operation 306, the remote phosphor mask may absorb at least a subset of the emitted, shorter-wavelength light. This subset of shorter-wavelength light may be downconverted by the one or more phosphors of the remote phosphor mask to longer-wavelength light than what was absorbed at operation 308. At operation 310, the one or more phosphors of the remote phosphor mask may emit the longer-wavelength light. The longer-wavelength light may produce a more visually appealing color temperature of light (e.g., less blue and more white). The longer-wavelength light may include light having a CCT of between about 2700K to 4000K in some embodiments. The method may also include generating a predetermined light distribution by passing light emitted from the light emitters through at least one optic. In some embodiments, the light emitted from the light emitters may be passed through the at least one optic prior to being absorbed by the one or more phosphors, while in other embodiments the light emitted from the light emitters may be passed through the at least one optic after being absorbed emitted by the one or more phosphors.

A light engine of a luminaire may be designed to generate a desired CCT using an arrangement of LEDs and/or other light emitters. For example, each LED may be designed to provide a native emission of short wavelength of light. To adjust the wavelength of light emitted by the luminaire to a desired CCT, each LED may be provided with a coating that includes one or more phosphors to downconvert a portion of the short wavelength light to one or more longer wavelengths. The luminaire may include one or more clear (or otherwise transparent) molded optics over the LEDs to refract the emitted light to a desired distribution. Individual LEDs may not be clearly visible because of the optic, but each LED generates light in a small area. In instances where one or more of the LEDs has developed a defect in the phosphor coating (such as where a void is formed and/or some of the phosphors have broken off), a "blue leak" may occur.

Figure 4:
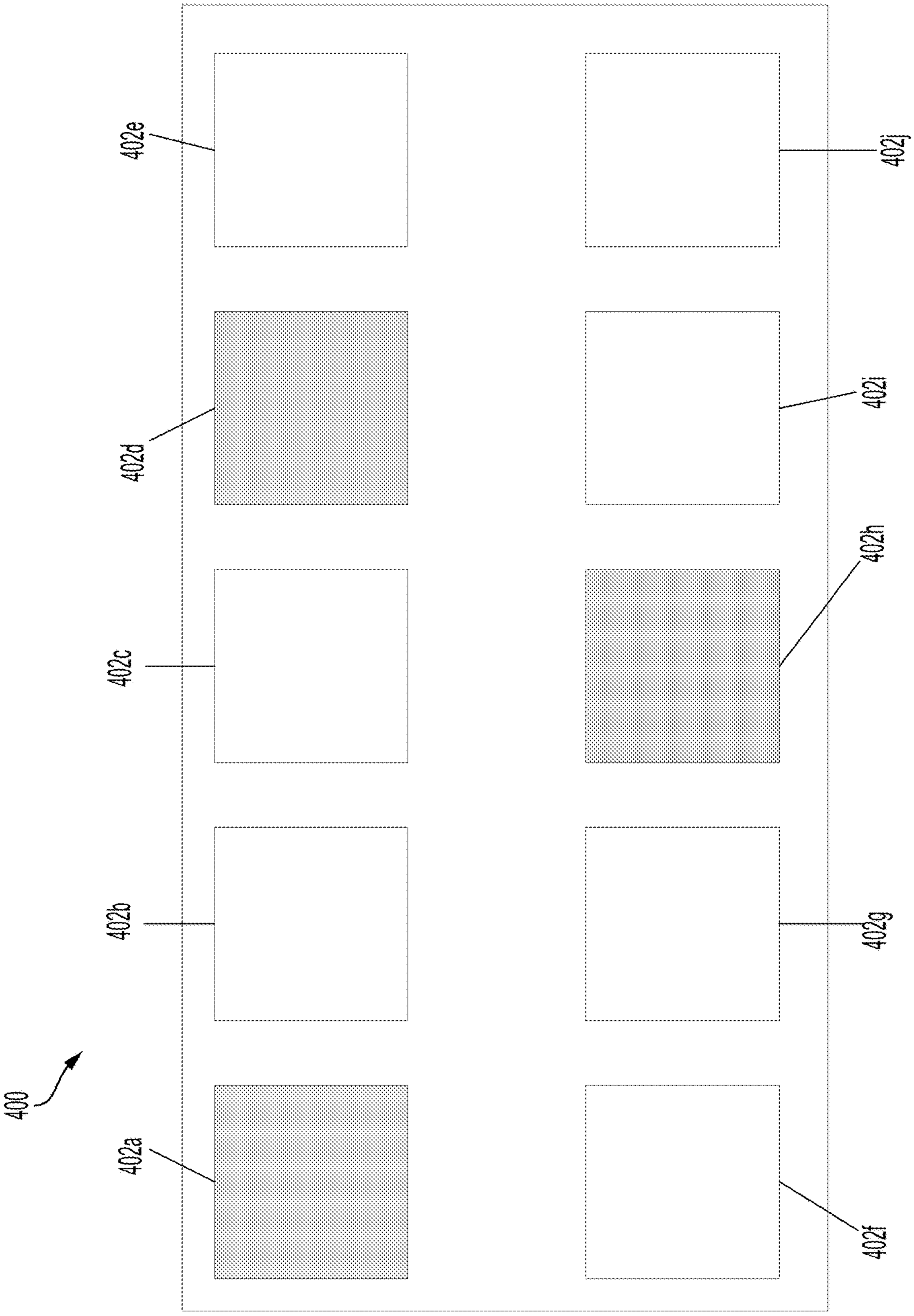
FIG. 4 illustrates an example of a defective luminaire.

FIG. 4 illustrates an example of a defective luminaire 400 that includes a number of "blue leaks". In the example illustrated, the defective luminaire 400 includes ten LEDs 402*a*-402*j*. Three of the LEDs 402 (those noted as 402*a*, 402*d*, and 402*h*) are defective. It is to be understood that any number or proportion of light emitters in a luminaire may be defective (e.g., three LEDs being defective is an arbitrary choice). In the example illustrated, LEDs 402 are designed and/or manufactured to produce and emit light having approximately the same color temperature. Each LED 402 provide a native emission of short wavelength light, and each is provided with a coating that includes one or more phosphors to downconvert a portion of the short wavelength light to one or more longer wavelengths. However, in the example illustrated, the phosphor coating of the defective has cracked or has otherwise been displaced. Thus, LEDs 402*a*, 402*d*, and 402*h* emit light that is notably harsher and "bluer" than the other LEDs 402.

The abundance of shorter wavelength, high energy light from the "blue leak" sites may manifest as bright spots. When "blue leaks" are present the clear optic may shift the net CCT of the luminaire higher and outside of a desired range. For example, one LED with a "blue leak" defect can shift the net CCT of the module to over 7000K, and several LEDs with this defect can shift the net CCT to an unmeasurably high value as shown in FIGS. 5-7.

Figure 5:
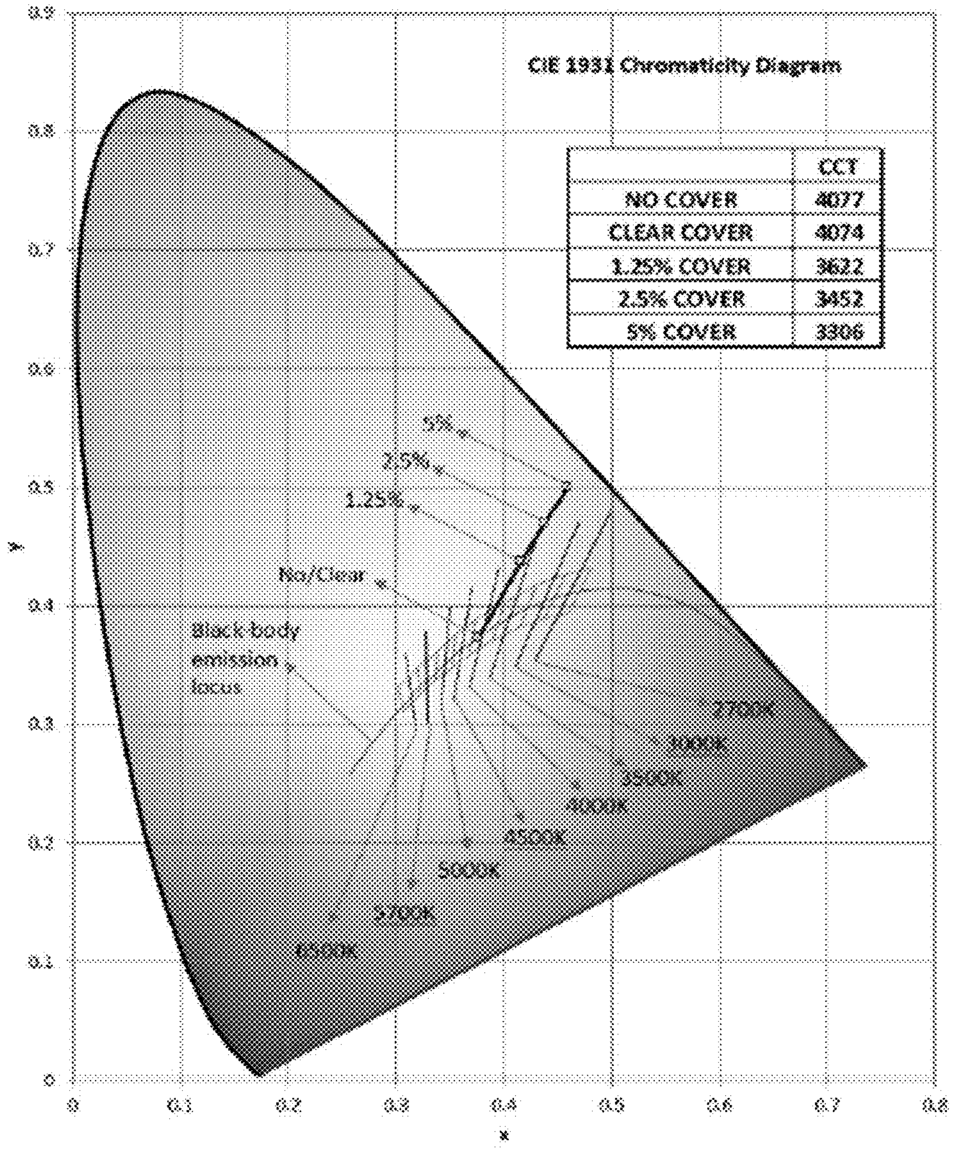
FIG. 5 is a plot showing the effects of various percentage phosphor contents in a remote phosphor mask on net chromaticity and thus correlated color temperature of light emitted from a non-defective luminaire.

FIG. 5 is a plot showing the effects of various percentage phosphor contents in a remote phosphor mask (such as remote phosphor mask 102 or 202), on net chromaticity and thus correlated color temperature of light emitted from a non-defective luminaire of the type shown in FIGS. 1A-1C, using the International Commission on Illumination (CIE) 1931 colorspace. The entire colorspace is shown, and within it, the well-known black-body emission locus usually thought of as defining "white," with various correlated color temperatures marked along the locus. Color temperature of the luminaire was tested with no cover and with an optically clear color in the shape of the remote phosphor mask discussed above. The chromaticity and CCTs of those variations were almost identical and are plotted as a small yellow square marked No/Clear. This performance is consistent with the as-designed performance of the luminaire. The same luminaire was tested with remote phosphor masks having 1.25%, 2.5%, and 5% phosphor content. These results are also plotted on the colorspace, and CCT of the luminaire with each mask is shown in a table in FIG. 5. Change of chromaticity and CCT were well behaved with respect to phosphor percentage. For the phosphor used, the chromaticity departed from the black-body locus toward a yellow part of the colorspace.

Figure 6:
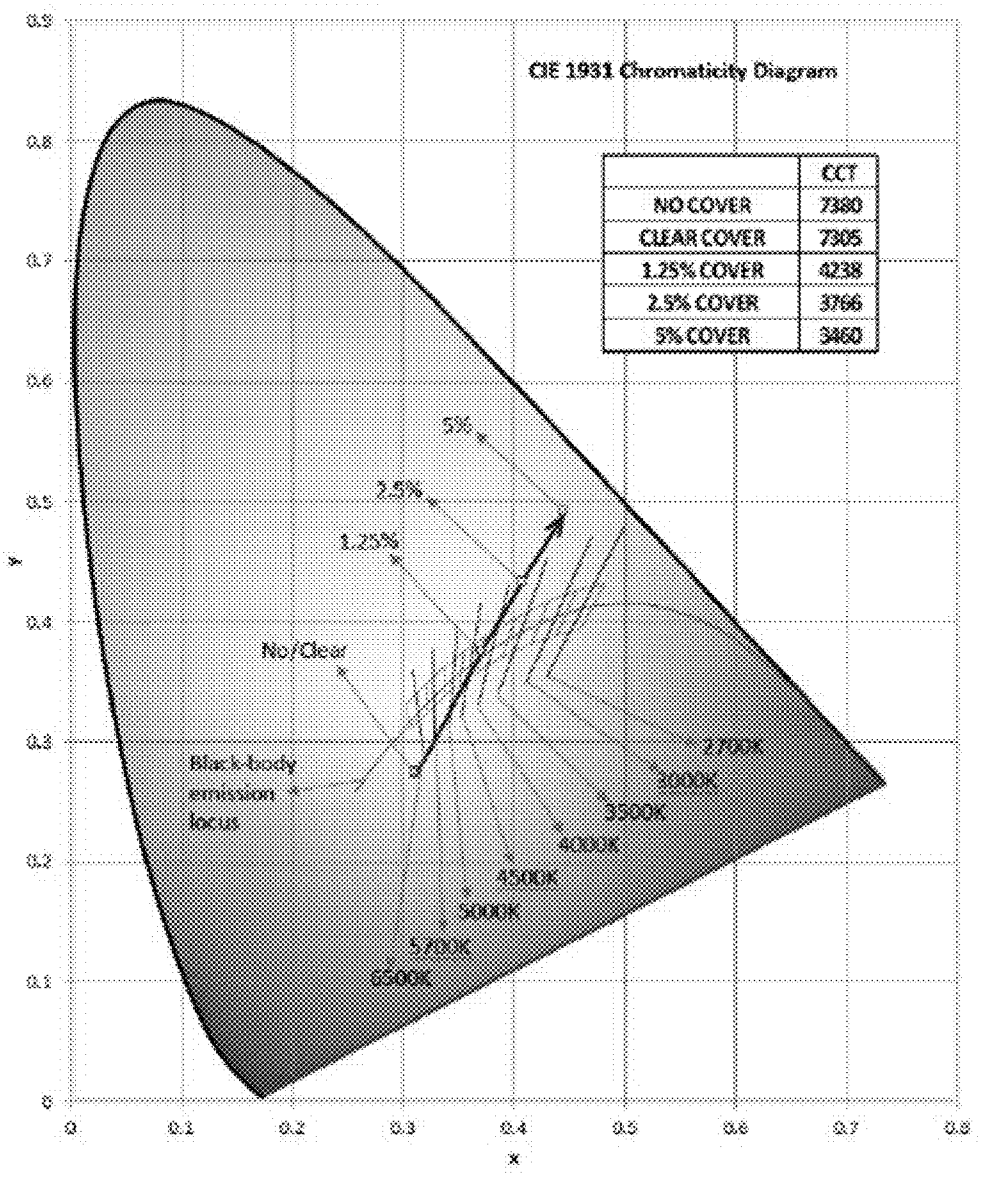
FIG. 6 is a plot showing the effects of various percentage phosphor contents in a remote phosphor mask on net chromaticity and thus correlated color temperature of light emitted from a luminaire.

FIG. 6 is a plot showing the effects of various percentage phosphor contents in a remote phosphor mask, on net chromaticity and thus correlated color temperature of light emitted from a luminaire of the type shown in FIGS. 1A-1C, with one "blue leak" LED, using the CIE 1931 colorspace. Although the results are somewhat similar to those shown in FIG. 5, the chromaticity and CCT of the luminaire with no mask, or a clear mask, was skewed into a high color temperature and toward a blue part of the colorspace. Increasing phosphor contents had similar effects as in FIG. 5, in terms of starting from the "no/clear" point and progressing toward the yellow part of the colorspace. For this particular luminaire, a 1.25% phosphor mask provided a fairly good chromaticity and CCT correction to 4236K vs. the nominal performance shown in FIG. 5, of about 4075K.

Figure 7:
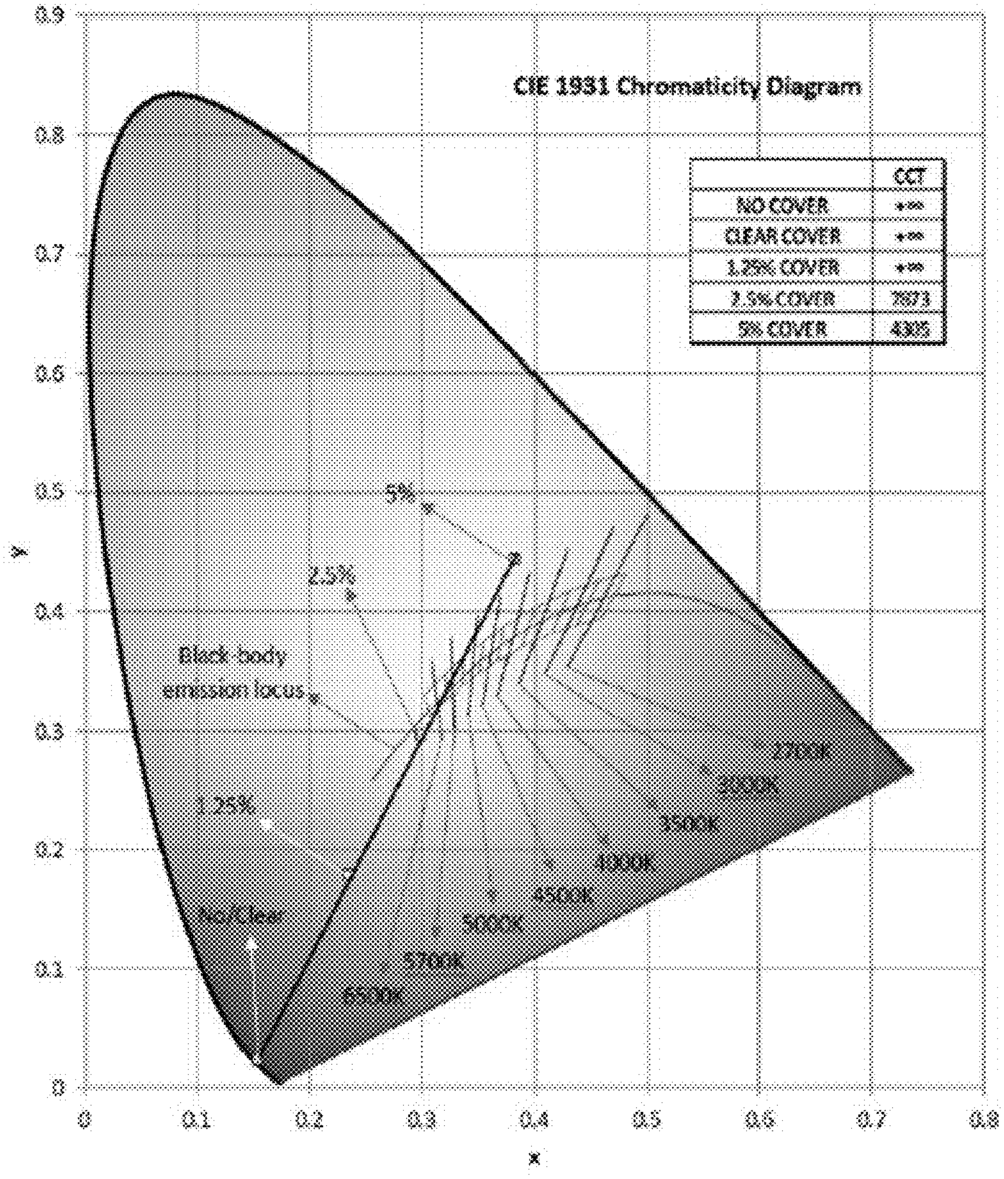
FIG. 7 is a plot showing the effects of various percentage phosphor contents in a remote phosphor mask on net chromaticity and thus CCT of light emitted from a luminaire.

FIG. 7 is a plot showing the effects of various percentage phosphor contents in a remote phosphor mask, on net chromaticity and thus CCT of light emitted from a luminaire of the type shown in FIGS. 1A-1C, with many "blue leak" LEDs, using the CIE 1931 colorspace. The chromaticity and CCT of the luminaire with no remote phosphor mask, or a clear mask, was skewed so far into the blue part of the colorspace that CCT cannot be determined. Increasing phosphor contents had similar effects as in FIGS. 5 and 6, in terms of starting from a "no mask/clear mask" point and progressing toward the yellow part of the colorspace. However, the results are far more sensitive to phosphor percentage. For this particular luminaire, a 1.25% phosphor mask provided an unmeasurable CCT; the 2.5% phosphor mask provided a CCT of 7873K, and the 5% phosphor mask provided a CCT of 4305K. It would be a matter of preference to use the 5% phosphor mask to get close to the nominal CCT of the luminaire, knowing that the chromaticity obtained would be in the yellow part of the colorspace. Other possibilities for using a phosphor mask for a luminaire with many "blue leak" LEDs could include use of different phosphor compounds.

Affixing a remote phosphor mask (e.g., remote phosphor mask 102 or 202) to the defective luminaire 400 may correct or reduce the described problem. For example, the phosphor included in the remote phosphor mask that is affixed to the defective luminaire 400 may absorb a portion of the shorter wavelength light emitted in aggregate from all of LEDs 402, and emit longer wavelength light in response to absorbing the shorter wavelength light. In a direct view, it may still be possible to pick out defective LEDs **402*a*, 402*d*, and 402*h* as "bluer" than the other LEDs 402**, but the net chromaticity of light emitted from the repaired luminaire will be corrected to a color temperature that is much closer to that of an equivalent luminaire without defective LEDs.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "an LED" includes a plurality of such LEDs, and reference to "the optic" includes reference to one or more optics and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A light system comprising:

a luminaire comprising one or more light emitters and at least one optic; and a remote phosphor mask that is reversibly coupled with the luminaire using at least one reversible coupling mechanism, the remote phosphor mask comprising one or more phosphors admixed with an optical material, wherein the one or more phosphors are capable of adjusting a color temperature of emitted light from the luminaire, wherein a light emission portion of the remote phosphor mask comprises at least one contour that conforms to a three-dimensional shape of one or both of the one or more light emitters and the at least one optic.

2. The light system of claim 1, wherein:

the remote phosphor mask is disposed outward of the at least one optic.

3. The light system of claim 1, wherein:

the remote phosphor mask is disposed between the one or more light emitters and the at least one optic.

4. The light system of claim 1, wherein:
the at least one contour comprises a projection that defines at least one cavity; and
the at least one cavity receives at least a portion of one or both of the one or more light emitters and the at least one optic.
5. The light system of claim 1, wherein:
the at least one reversible coupling mechanism comprises an adhesive.
6. The light system of claim 1, wherein:
the at least one reversible coupling mechanism is selected from the group consisting of a fastener, a clamp, an interference fit connection, a press fit connection, a clip, and a snap.
7. The light system of claim 1, further comprising:
a base that supports the one or more light emitters and the at least one optic; and
an outer frame that extends over a portion of the remote phosphor mask and couples with the base to secure the remote phosphor mask to the luminaire.
8. A remote phosphor mask for a luminaire, comprising:
a body formed of an optical material admixed with one or more phosphors, the body comprising a light emission portion, wherein:
the one or more phosphors are capable of adjusting a color temperature of emitted light from the luminaire,
the body is configured to be reversibly coupled with the luminaire using at least one reversible coupling mechanism, and
the light emission portion of the remote phosphor mask comprises at least one contour that conforms to a three-dimensional shape of one or both of a light emitter and an optic of the luminaire.
9. The remote phosphor mask for a luminaire of claim 8, wherein:
the remote phosphor mask is configured to be positioned remote from a light emitter of the luminaire.
10. The remote phosphor mask for a luminaire of claim 8, wherein:
the at least one reversible coupling mechanism comprises an adhesive applied to an inner surface of the remote phosphor mask.
11. The remote phosphor mask for a luminaire of claim 8, wherein:
the at least one reversible coupling mechanism is selected from the group consisting of a fastener, an aperture for receiving a separate fastener, a clamp, an interference fit connector, a press fit connector, a clip, and a snap.
12. The remote phosphor mask for a luminaire of claim 8, wherein:
the light emission portion of the remote phosphor mask has a substantially uniform thickness.
13. A method of using a remote phosphor mask, comprising:
providing a remote phosphor mask on a luminaire, wherein:
the remote phosphor mask includes one or more phosphors; and
the remote phosphor mask is reversibly coupled with the luminaire using at least one reversible coupling mechanism;
emitting light from light emitters of the luminaire, wherein at least a portion of the light includes a shorter-wavelength light;
absorbing, by the one or more phosphors in the remote lighting mask, at least a subset of the shorter-wavelength light;
down converting the subset of the shorter-wavelength light to longer-wavelength light; and
emitting, by the one or more phosphors in the remote lighting mask, longer-wavelength light, wherein the longer-wavelength light has a correlated color temperature (CCT) of between about 2700K to 4000K.
14. The method of using a remote phosphor mask of claim 13, wherein:
the shorter-wavelength light has a correlated color temperature (CCT) of at least 5000K.
15. The method of using a remote phosphor mask of claim 13, further comprising:
generating a predetermined light distribution by passing light emitted from the light emitters through at least one optic.
16. The method of using a remote phosphor mask of claim 15, wherein:
the light emitted from the light emitters is passed through the at least one optic prior to being absorbed by the one or more phosphors.
17. The method of using a remote phosphor mask of claim 15, wherein:
the light emitted from the light emitters is passed through the at least one optic after being absorbed emitted by the one or more phosphors.

* * * * *